(12) United States Patent
Sekiguchi et al.

(10) Patent No.: US 11,022,059 B2
(45) Date of Patent: *Jun. 1, 2021

(54) ABNORMALITY DETERMINATION APPARATUS FOR INTERNAL COMBUSTION ENGINE

(71) Applicant: HONDA MOTOR CO., LTD., Tokyo (JP)

(72) Inventors: Toru Sekiguchi, Wako (JP); Takashi Konomoto, Wako (JP); Toshifumi Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,350

(22) Filed: Jan. 16, 2020

(65) Prior Publication Data

US 2020/0256271 A1 Aug. 13, 2020

(30) Foreign Application Priority Data

Feb. 8, 2019 (JP) .............................. JP2019-021331

(51) Int. Cl.
*F02D 41/22* (2006.01)
*F02D 41/00* (2006.01)
*F01M 13/02* (2006.01)

(52) U.S. Cl.
CPC ........... *F02D 41/22* (2013.01); *F01M 13/023* (2013.01); *F02D 41/0002* (2013.01)

(58) Field of Classification Search
CPC ..... F02D 41/22; F02D 41/0002; F01M 13/00; F01M 13/023; F01M 2013/026;
(Continued)

(56) References Cited

U.S. PATENT DOCUMENTS

| 7,259,575 B2 | 8/2007 | Lvovich et al. |
| 9,127,578 B2 * | 9/2015 | Pursifull ................ F01M 13/00 |

(Continued)

FOREIGN PATENT DOCUMENTS

| JP | 2013-002382 A | 7/2013 |
| JP | 2016-517520 A | 6/2016 |

(Continued)

OTHER PUBLICATIONS

Office Action dated Sep. 18, 2020, issued in counterpart Japanese Patent Application No. 2019-021331, with English language translation. (6 pages).

(Continued)

*Primary Examiner* — Gonzalo Laguarda
(74) *Attorney, Agent, or Firm* — Westerman, Hattori, Daniels & Adrian, LLP

(57) ABSTRACT

An abnormality determination apparatus for an internal combustion engine in which an intake passage upstream of a supercharger and a crankcase are connected by a breather line includes: an intake flow rate detection unit that detects an intake flow rate in the intake passage; and an abnormality determination unit that determines abnormality of the breather line. The abnormality determination unit accumulates a time for which a rotation second-order component of a fluctuation waveform of the intake flow rate is equal to or more than a threshold over a predetermined period of time and determines the abnormality of the breather line when the accumulated value is less than a predetermined accumulation threshold.

6 Claims, 5 Drawing Sheets

(58) Field of Classification Search
CPC ... F01M 2013/0077; F01M 2013/0083; F01M 2013/0088; F01M 2013/0094; Y02T 10/40
USPC ............. 123/572, 573, 574, 198 D; 701/107; 73/114.39
See application file for complete search history.

(56) References Cited

U.S. PATENT DOCUMENTS

| | | | |
|---|---|---|---|
| 9,664,079 B2* | 5/2017 | Jentz | F01M 11/10 |
| 9,920,669 B2* | 3/2018 | De Luca | F02D 41/22 |
| 10,043,352 B2* | 8/2018 | Henson | F01M 13/022 |
| 10,808,658 B2* | 10/2020 | Sekiguchi | G01M 15/09 |
| 2008/0041144 A1* | 2/2008 | Layher | F02B 77/085 |
| | | | 73/115.01 |
| 2014/0081548 A1* | 3/2014 | Pursifull | F02M 25/06 |
| | | | 701/101 |
| 2014/0081551 A1 | 3/2014 | Rollinger et al. | |
| 2020/0256272 A1* | 8/2020 | Sekiguchi | F02D 41/0007 |

FOREIGN PATENT DOCUMENTS

| | | |
|---|---|---|
| JP | 2017-78378 A | 4/2017 |
| JP | 2019-044699 A | 3/2019 |
| JP | 6584461 B2 | 9/2019 |
| JP | 2020-114993 A | 7/2020 |

OTHER PUBLICATIONS

Office Action dated Sep. 18, 2020, issued in counterpart Japanese Patent Application No. 2019-021330, with English language translation. (8 pages).

\* cited by examiner

ABNORMALITY DETERMINATION APPARATUS FOR INTERNAL COMBUSTION ENGINE

CROSS REFERENCES TO RELATED APPLICATIONS

The present application claims priority under 35 U.S.C. § 119 to Japanese Patent Application No. 2019-021331, filed Feb. 8, 2019, entitled "Abnormality Determination Apparatus for Internal Combustion Engine." The contents of this application are incorporated herein by reference in their entirety.

TECHNICAL FIELD

The present disclosure relates to an abnormality determination apparatus for an internal combustion engine in which an intake passage upstream of a supercharger and a crankcase are connected by a breather line.

BACKGROUND

Such an abnormality determination apparatus for an internal combustion engine is described as a second embodiment in Japanese Unexamined Patent Application Publication No. 2017-078378. In such a case where the connection portion of the breather line to the intake passage has come off, the connection portion serves as an opening end portion for the air column of the intake passage, thus causing the resonant frequency of the air column to change. Focusing on this fact, this abnormality determination apparatus for an internal combustion engine monitors the magnitude of the pulsation of the intake flow rate in the intake passage to determine whether the connection portion of the breather line has come off.

In the above-described conventional abnormality determination apparatus, if the load on the internal combustion engine temporarily fluctuates due to disturbance or the like, the pulsation of the intake flow rate fluctuates to a large extent. For this reason, there is a possibility that the above-described conventional abnormality determination apparatus erroneously determines whether the connection portion of the breather line has come off.

SUMMARY

It is desirable to precisely determine the abnormality of a breather line of an internal combustion engine without being affected by disturbance or the like.

A first aspect of the disclosure proposes an abnormality determination apparatus for an internal combustion engine in which an intake passage upstream of a supercharger and a crankcase are connected by a breather line, including: an intake flow rate detection unit that detects an intake flow rate in the intake passage; and an abnormality determination unit that determines abnormality of the breather line, wherein the abnormality determination unit accumulates a time for which a rotation second-order component of a fluctuation waveform of the intake flow rate is equal to or more than a threshold over a predetermined period of time and determines the abnormality of the breather line when the accumulated value is less than a predetermined accumulation threshold.

According to the configuration of the first aspect, it is possible to precisely determine the abnormality of the breather line based on the rotation second-order component of the fluctuation waveform of the intake flow rate, which is unlikely to be affected by fluctuation in load on the internal combustion engine due to disturbance or the like.

A second aspect of the disclosure proposes an abnormality determination apparatus for an internal combustion engine in which in addition to the configuration of the first aspect, the rotation second-order component is calculated by multiplying the fluctuation waveform of the intake flow rate by a sine wave and a cosine wave corresponding to an angular velocity of a crank, followed by integration.

According to the configuration of the second aspect, it is possible to easily calculate the rotation second-order component of the fluctuation waveform of the intake flow rate.

Note that an air flow meter 16 in an embodiment corresponds to the intake flow rate detection unit of the disclosure.

BRIEF DESCRIPTION OF THE DRAWINGS

The advantages of the disclosure will become apparent in the following description taken in conjunction with the following drawings.

DETAILED DESCRIPTION

Hereinafter, an embodiment of the disclosure will be described based on FIGS. 1 to 4.

Figure 1:
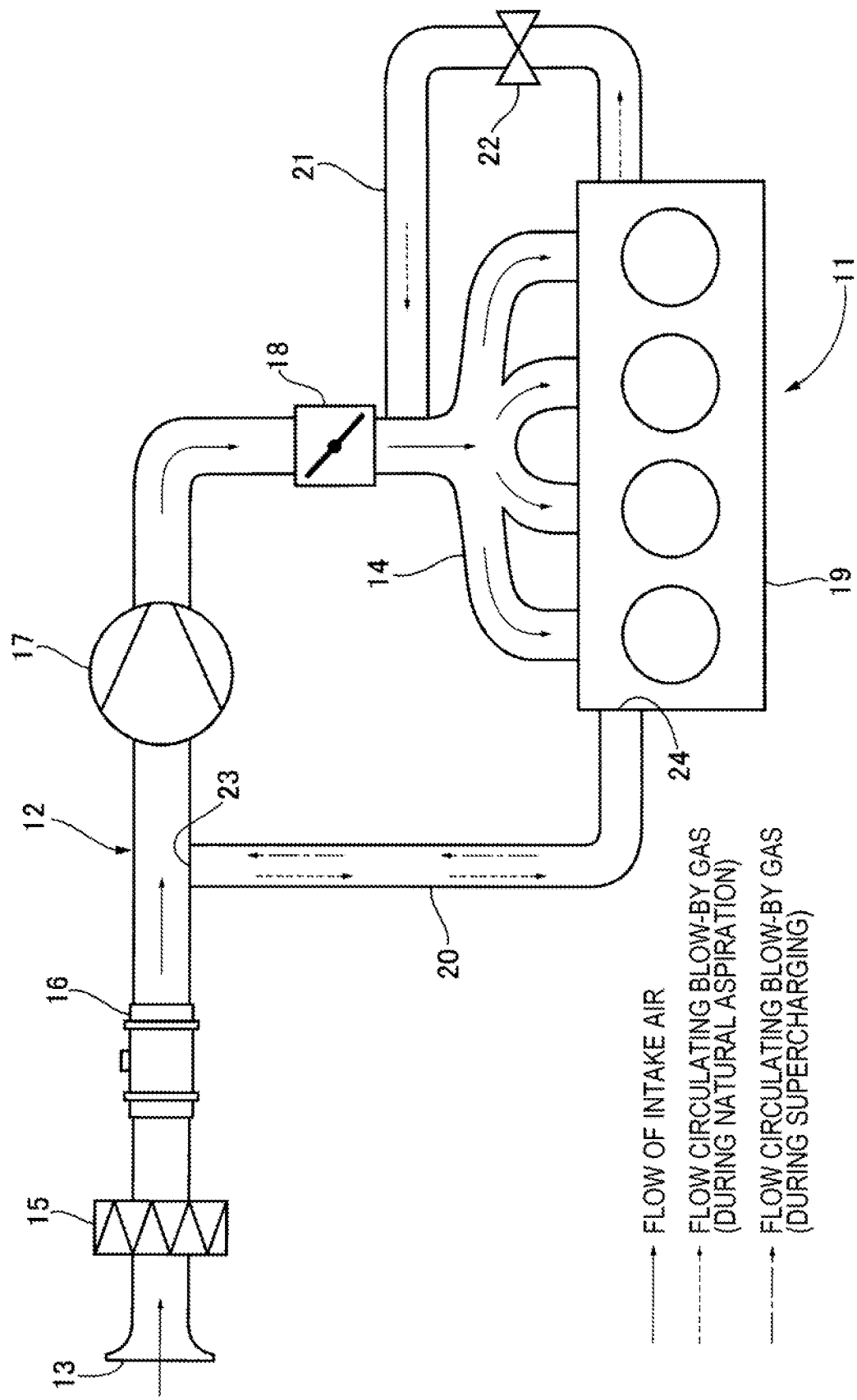
FIG. 1 is a diagram illustrating the configuration of an internal combustion engine including an abnormality determination apparatus for a breather line of one embodiment.

As illustrated in FIG. 1, on an intake passage 12 of an in-line four-cylinder 4-cycle internal combustion engine 11 to be mounted on an automobile, disposed are: an air cleaner 15, which removes dust in intake air; an air flow meter 16, which measures the intake flow rate; a supercharger 17 composed of a turbocharger or a supercharger, which pressurizes the intake air; and a throttle valve 18, which adjusts the intake flow rate by narrowing the intake passage 12, in this order from an inlet 13 at the upstream end in the flow direction of the intake air toward an intake manifold 14 at the downstream end in the flow direction of the intake air. A portion of the intake passage 12 between the air flow meter 16 and the supercharger 17 and a crankcase 19 of the internal combustion engine 11 are connected by a breather line 20. The intake manifold 14 and the crankcase 19 of the internal combustion engine 11 are connected by a positive crankcase ventilation (PCV) line 21, and a middle portion of the PCV line 21 is opened and closed by a PCV valve 22.

Part of the fuel component contained in the intake air flows from the combustion chamber of the internal combustion engine 11 into the crankcase 19 through a gap between a piston and a cylinder as a blow-by gas, which is returned to the intake passage 12 through the breather line 20 or is returned to the intake passage 12 through the PCV line 21. The fuel component contained in the blow-by gas is thus prevented from being released to the atmosphere.

Specifically, when the PCV valve 22 is opened during natural aspiration in which the supercharger 17 is not activated, the atmospheric pressure acts on the intake passage 12 upstream of the throttle valve 18 while the intake negative pressure of the internal combustion engine 11 acts on the intake passage 12 downstream of the throttle valve 18. Hence, the intake air in the intake passage 12 upstream of the throttle valve 18 flows through the breather line 20 into the crankcase 19. From the crankcase 19, the intake air together with the blow-by gas is returned into the intake manifold 14 through the PCV line 21. The blow-by gas together with the intake air is eventually supplied into the combustion chamber of the internal combustion engine 11.

Moreover, at the time of supercharging in which the supercharger 17 is activated, the supercharging pressure acts on the intake passage 12 downstream of the supercharger 17. Once the PCV valve 22 is closed, the supercharging pressure is prevented from escaping through the PCV line 21 into the crankcase 19. The blow-by gas in the crankcase 19 is sucked out into the intake passage 12 by the negative pressure generated upstream of the activated supercharger 17. From the intake passage 12, the blow-by gas together with the intake air is supplied into the combustion chamber of the internal combustion engine 11 through the intake passage 12.

In a case where during the supercharging of the internal combustion engine 11, a first connection portion 23 at which the breather line 20 is connected to the intake passage 12 comes off or a second connection portion 24 at which the breather line 20 is connected to the crankcase 19 comes off, the blow-by gas flowing through the breather line 20 from the crankcase 19 toward the intake passage 12 is possibly released to the atmosphere. For this reason, it is necessary to detect such abnormality of the breather line 20 and issue an alert.

Figure 2:
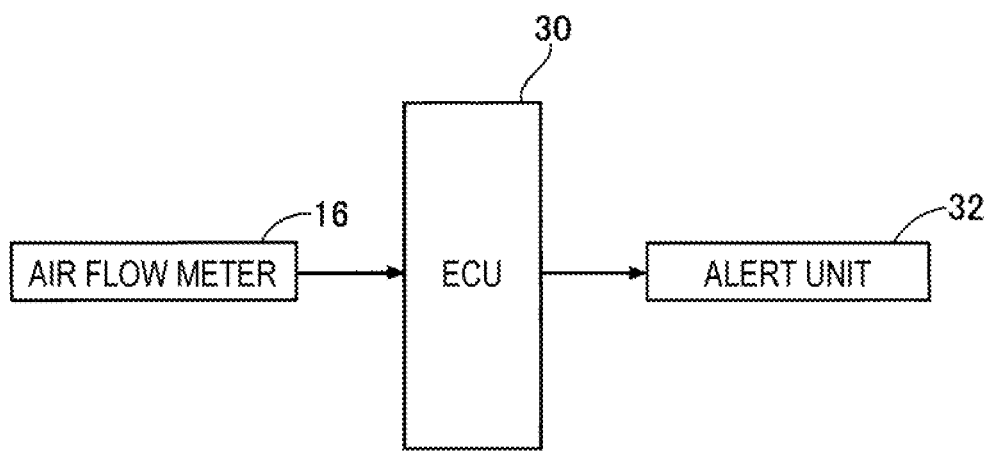
FIG. 2 is a block diagram of the abnormality determination apparatus for the breather line of one embodiment.

As illustrated in FIG. 2, to an abnormality determination unit 30 formed of an electronic control unit that determines abnormality of the breather line 20, the air flow meter 16 and an alert unit 32 are connected. The alert unit 32 is formed of a liquid crystal panel provided on an instrument panel, for example.

Next, the action of the embodiment including the above-described configuration will be described.

Figure 3A:
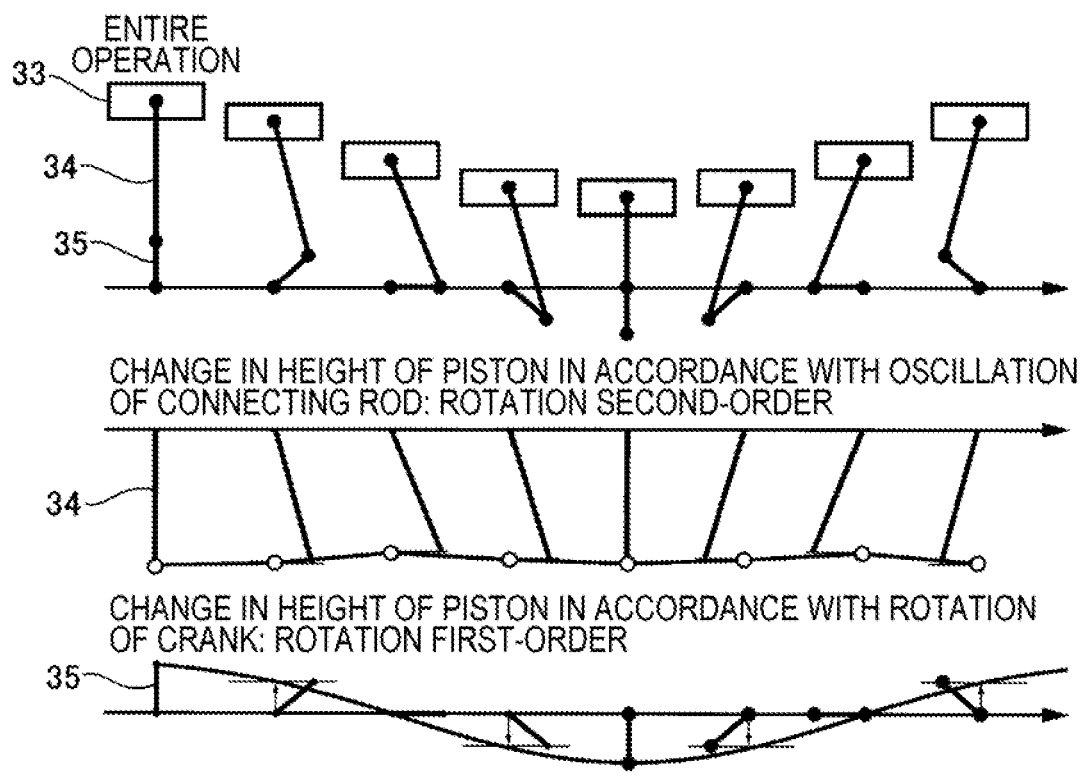
FIGS. 3A and 3B are explanatory diagrams for change in position of a piston associated with the rotation of a crankshaft of one embodiment.

As illustrated in FIG. 3A, a piston 33 of the internal combustion engine 11 is connected to a crankshaft 35 by a connecting rod 34. The height of the piston 33 (the position in the direction of movement of the piston 33) changes as a function of the rotational position of the crankshaft 35 and the oscillation position of the connecting rod 34. That is, the fluctuation in the height of the piston 33 attributable to the rotation of the crankshaft 35 is a rotation first-order fluctuation in which the height fluctuates once per revolution of the crankshaft 35. On the other hand, the fluctuation in the height of piston 33 attributable to the oscillation of the connecting rod 34 is a rotation second-order fluctuation in which the height fluctuates twice per revolution of the crankshaft 35.

Figure 3B:
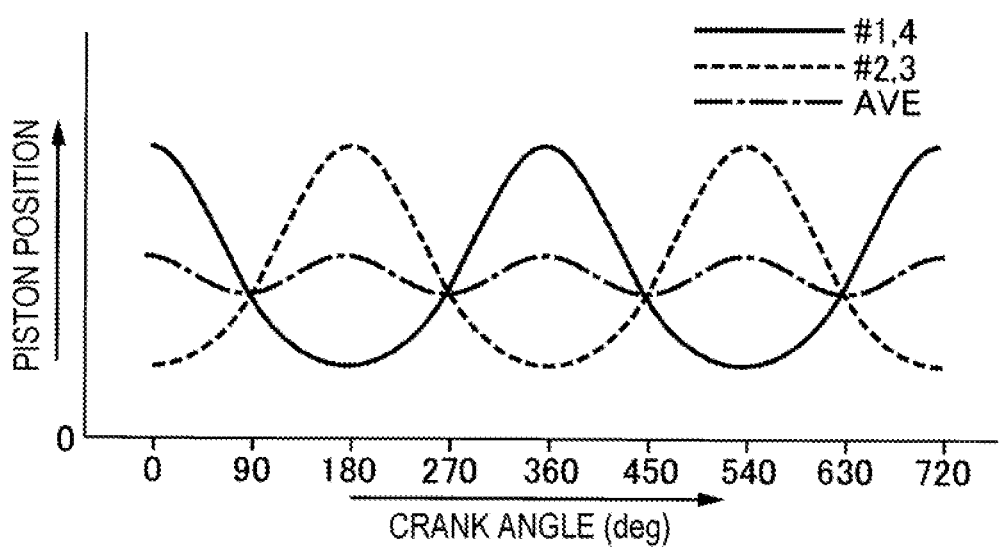

As illustrated in FIG. 3B, in the in-line four-cylinder 4-cycle internal combustion engine 11, the pistons 33 of the #1 cylinder and the #4 cylinder operate at the same phase while the pistons 33 of the #2 cylinder and the #3 cylinder operate at a different phase shifted by 180° from the above phase. Hence, the internal pressure fluctuation of the crankcase 19 attributable to the oscillations of the four connecting rods 34 is a rotation second-order fluctuation in which the internal pressure fluctuates twice per revolution of the crankshaft 35.

When the rotation second-order fluctuation is generated in the internal pressure of the crankcase 19 as described above, the pressure fluctuation is transmitted to the intake passage 12 through the breather line 20, causing the rotation second-order fluctuation in the intake flow rate in the intake passage 12. The present embodiment is configured to determine the abnormality of the breather line 20 based on the rotation second-order fluctuation in the intake flow rate generated in the intake passage 12.

Note that the number of cylinders of the internal combustion engine 11 to which the embodiment is applied is not particularly limited. However, in a V-type 6-cylinder internal combustion engine, the pressure fluctuations in the internal pressure of the crankcase 19 due to the movements of 6 pistons 33 cancel out, so that the fluctuations in the internal pressure of the crankcase 19 are relatively small. Hence, the present disclosure is favorably applicable to the in-line four-cylinder internal combustion engine 11.

Figure 4:
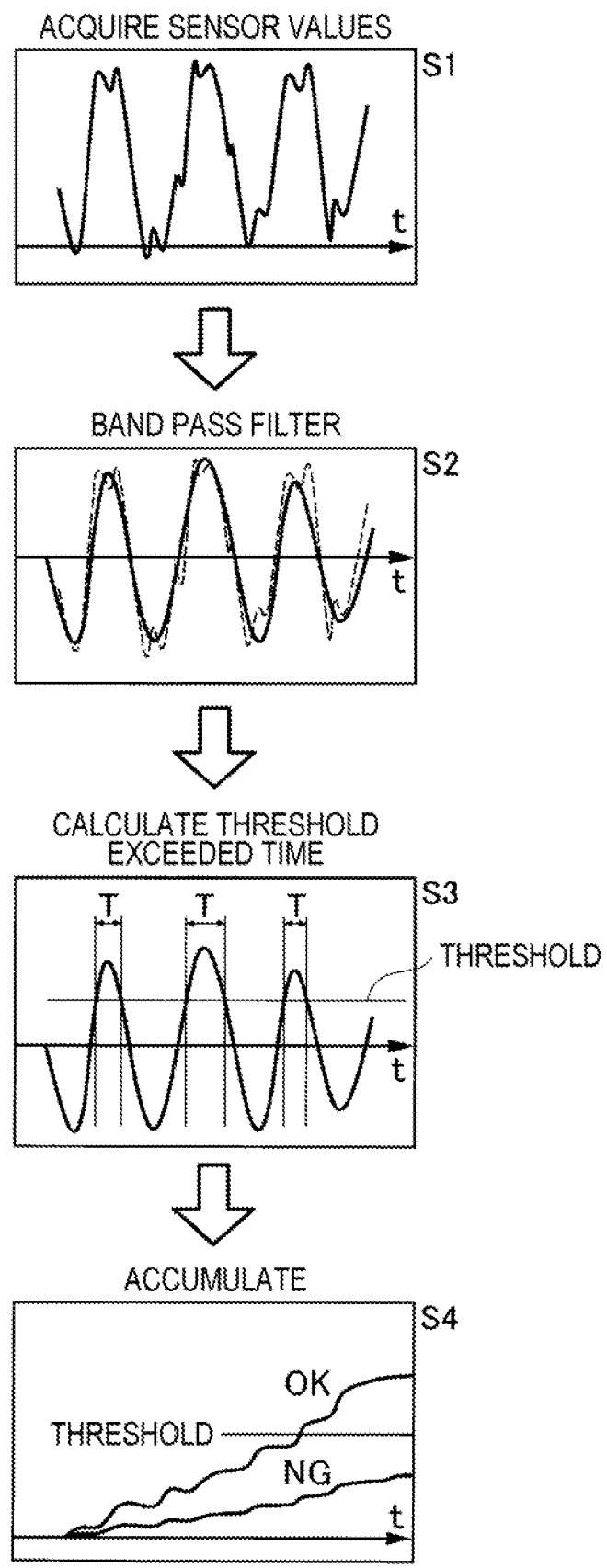
FIG. 4 is an explanatory diagram of procedure of determining abnormality of the breather line of one embodiment.

Next, the procedure of determining the abnormality of the breather line 20 will be described based on FIG. 4.

The determination of the abnormality of the breather line 20 of the present embodiment is executed when the flow rate of the intake air detected by the air flow meter 16 is a predetermined value or more and the internal combustion engine 11 is being operated with a load of a predetermined value or more. This is because when the internal combustion engine 11 is being operated with a small load, the fluctuation in the intake flow rate in the intake passage 12 is small, making it difficult to obtain the amount of fluctuation necessary to determine abnormality with high precision.

First, in Step S1, the fluctuation in the intake flow rate in the intake passage 12 is detected by the air flow meter 16. As described above, a periodic pressure fluctuation is generated in the crankcase 19 by the movement of the piston 33. This periodic pressure fluctuation is transmitted to the intake passage 12 through the breather line 20 connected to the crankcase 19, generating the fluctuation in the intake flow rate. The fluctuation in the intake flow rate in the intake passage 12 contains the rotation first-order component, the rotation second-order component, and rotation third-order and higher-order components. However, since the rotation third-order and higher-order components are small, the rotation first-order component and the rotation second-order component are dominant.

In subsequent Step S2, only the rotation second-order component in the fluctuation in the intake flow rate in the intake passage 12 is extracted using a bandpass filter.

The principle of the bandpass filter for extracting only the rotation second-order component from the fluctuation in the intake flow rate in the intake passage 12 will be described below.

Figure 5:
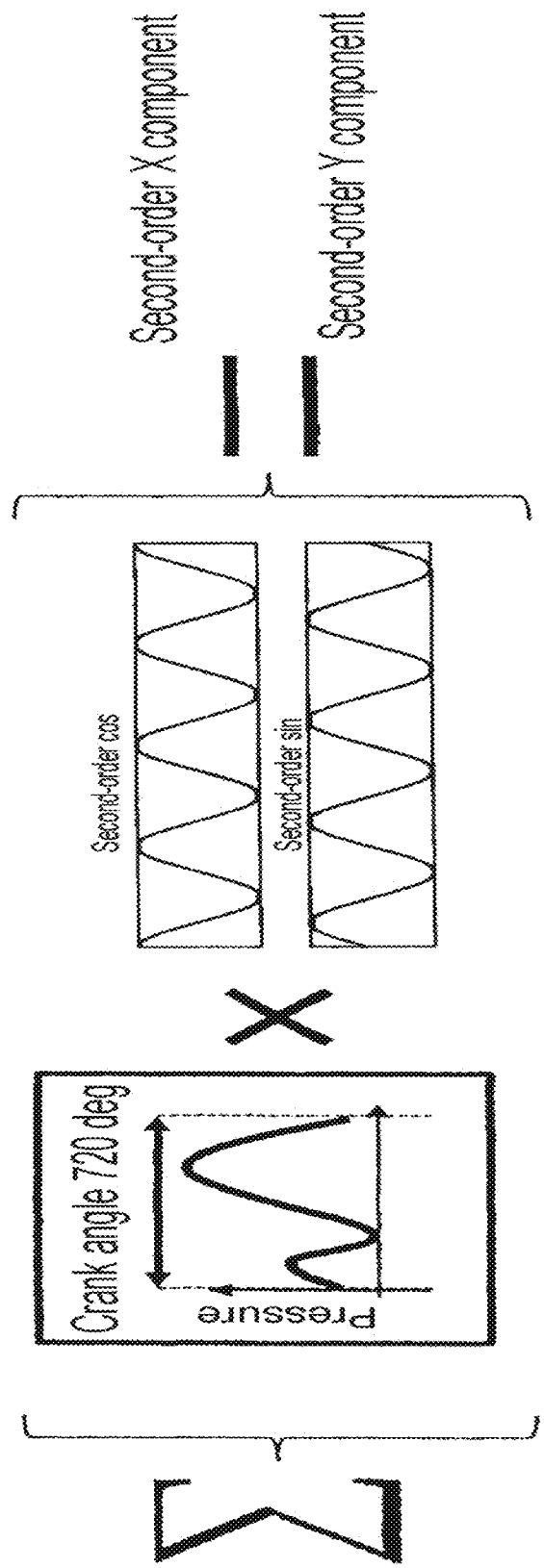
FIG. 5 describes bandpass filter for extracting only the rotation second-order component from the fluctuation in the intake flow rate in the intake passage.

As illustrated in FIG. 5 ([Math. 1]), if a value obtained by multiplying a certain fluctuation waveform of the intake flow rate in the intake passage 12 detected by the air flow meter 16 by the second-order sine wave is added for each phase, the X component of the rotation second-order component of the certain waveform is obtained. If a value obtained by multiplying the certain waveform by the second-order cosine wave is added for each phase, the Y component of the rotation second-order component of the certain waveform is obtained.

To be more specific, the certain waveform f(t) may be expressed as [Math. 2], summation of sine waves $\sin(\omega t)$, $\sin(2\omega t)$, $\sin(3\omega t)$, ... and cosine waves $\cos(\omega t)$, $\cos(2\omega t)$, $\cos(3\omega t)$, ... in accordance with Fourier series expansion. Here, the angular frequency $\omega$ has one cycle with 720 deg corresponding to two rotations of the crankshaft 35.

$$f = 1 + a_1 \sin(\omega t) + b_1 \cos(\omega t) + a_2 \sin(2\omega t) + b_2 \cos(2\omega t) + \ldots \quad \text{[Math. 2]}$$

When the [Math. 2] is multiplied by the sine wave $\sin(\omega t)$, followed by integration, only the Fourier coefficient a1 of the angular frequency sine wave is left as shown in [Math. 3].

$$\int f \cdot \sin(\omega t) \cdot dt = \quad \text{[Math. 3]}$$

$$\int (1 + a_1 \sin(\omega t) + b_1 \cos(\omega t) + a_2 \sin(2\omega t) + \ldots) \cdot \sin(\omega t) \cdot dt =$$

$$\int (\sin(\omega t) + a_1 \sin(\omega t) \cdot \sin(\omega t) + b_1 \cos(\omega t) \cdot \sin(\omega t) +$$

$$a_2 \sin(2\omega t) \cdot \sin(\omega t) + \ldots) \cdot dt =$$

$$\boxed{\int \sin(\omega t) \cdot dt}^{=0} + \int a_1 \sin(\omega t)^2 \cdot dt +$$

$$\boxed{\int b_1 \cos(\omega t) \cdot \sin(\omega t) \cdot dt + \int a_2 \sin(2\omega t) \cdot dt + \ldots}^{=0} =$$

$$\pi a_1$$

Similarly, when the [Math. 2] is multiplied by the cosine wave $\cos(\omega t)$, followed by integration, only the Fourier coefficient b1 of the angular frequency cosine wave is left. It is thus possible to easily obtain the rotation second-order component of the certain waveform f(t) from these Fourier coefficients a1 and b1.

Once the rotation second-order component in the fluctuation in the intake flow rate in the intake passage 12 is extracted in Step S2 as described above, a time T for which a peak portion of the rotation second-order component in the fluctuation in the intake flow rate in the intake passage 12 is equal to or more than a predetermined threshold is accumulated over a predetermined period of time (for example, 2 to 10 seconds) in Step S3. If the accumulated value is equal to or more than an accumulation threshold, the breather line 20 is determined to be normal. If the accumulated value is less than the accumulation threshold, the breather line 20 is determined to be abnormal and the alert unit 32 is activated to notify a passenger of that effect.

The reason why it is possible to determine whether the breather line 20 is normal or abnormal from the accumulated value of the time T for which the rotation second-order component in the fluctuation in the intake flow rate in the intake passage 12 is equal to or more than the predetermined threshold is as described below. In a case where the breather line 20 is normal and is not in communication with the atmosphere, the pressure fluctuation of the crankcase 19 is transmitted as it is to the intake passage 12 from the breather line 20 and the resulting fluctuation in the intake flow rate in the intake passage 12 is detected by the air flow meter 16. Hence, if the detected fluctuation in the intake flow rate in the intake passage 12 is large, that is, if the peak portion of the intake flow rate is equal to or more than the threshold, it is possible to determine that the breather line 20 is not in communication with the atmosphere and is normal. On the other hand, if the breather line 20 has come off the first or second connection portion 23 or 24 or is broken in a middle thereof, the breather line 20 communicates with the atmosphere and the fluctuation in the intake flow rate in the intake passage 12 is reduced. Hence, if the detected fluctuation in the intake flow rate is small, that is, if the peak portion of the intake flow rate is likely to be less than the threshold, it is possible to determine that the breather line 20 is in communication with the atmosphere and is abnormal.

Meanwhile, consider a case where the magnitude of the fluctuation in the intake flow rate in the intake passage 12 is evaluated. If the intake flow rate fluctuates to a positive value and a negative value, merely accumulating the intake flow rate over a predetermined period of time results in incorrect evaluation because the positive and negative values cancel out. In view of this, as in the present embodiment, accumulating the time T for which the peak portion of the fluctuation in the intake flow rate is equal to or more than the predetermined threshold over the predetermined period of time makes it possible to correctly evaluate the magnitude of the fluctuation in the intake flow rate and conduct the abnormality determination with high precision.

In addition, if the load on the internal combustion engine 11 fluctuates due to disturbance or the like, the rotation first-order component of the fluctuation in the intake flow rate in the intake passage 12 also fluctuates. However, since the rotation second-order component is hardly affected, it is possible to increase the determination precision and prevent erroneous determination from occurring by conducting the abnormality determination on the breather line 20 base on the rotation second-order component.

Although the embodiment of the disclosure has been described so far, various modifications in design may be made without departing from the scope of the disclosure.

For example, the number of cylinders of the internal combustion engine 11 is not limited to the four in the embodiment.

Moreover, although the breather line 20 is connected to the crankcase 19 in the embodiment, it is also possible to achieve the advantageous effect of the disclosure by causing the internal space of the crankcase 19 and the internal space of a head cover to communicate and connecting the breather line 20 to the head cover. Hence, an embodiment in which the breather line 20 is connected to another space that communicates with the crankcase 19 is also encompassed by the scope of the disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An abnormality determination apparatus of an internal combustion engine in which an intake passage located upstream of a forced-induction system and a crankcase are connected by a breather line, comprising:
   an intake flow rate detection detector that detects an intake flow rate in the intake passage; and
   an abnormality determination unit that determines abnormality of the breather line, wherein
   the abnormality determination unit:
   determine a length of time T during which a rotation second-order component of a fluctuation waveform of the intake flow rate is equal to or more than a threshold for each peak in fluctuation of the rotation second-order component over a predetermined period of time,
   accumulates the length of time T to obtain an accumulated value of length of time, and determines occurrence of the abnormality of the breather line when the accumulated value is less than a predetermined accumulation threshold, wherein the rotation second-order component of the fluctuation waveform of the intake flow is a fluctuation waveform which fluctuates twice per revolution of a crankshaft of the internal combustion engine.

2. The abnormality determination apparatus of an internal combustion engine according to claim 1, wherein
the rotation second-order component is calculated by multiplying the fluctuation waveform of the intake flow rate by a sine wave and a cosine wave corresponding to an angular velocity of a crank of the engine, followed by integration.

3. The abnormality determination apparatus of an internal combustion engine according to claim 1, wherein
the rotation second-order component represents a rotation second-order fluctuation generated in an internal pressure of the crankcase.

4. An abnormality determination method of an internal combustion engine in which an intake passage located upstream of a forced-induction system and a crankcase are connected by a breather line, the method comprising steps of:
detecting by a detector an intake flow rate in the intake passage;
determining by a computer a length of time T during which a rotation second-order component of a fluctuation waveform of the intake flow rate is equal to or more than a threshold for each peak in fluctuation of the rotation second-order component over a predetermined period of time
accumulating by a computer the length of time T to obtain an accumulated value of length of time; and
determining by the computer occurrence of the abnormality of the breather line when the accumulated value is less than a predetermined accumulation threshold,
wherein the rotation second-order component of the fluctuation waveform of the intake flow is a fluctuation waveform which fluctuates twice per revolution of a crankshaft of the internal combustion engine.

5. The abnormality determination method of an internal combustion engine according to claim 4, wherein the step of detecting the intake flow rate in the intake passage is performed during the forced-induction system is activated.

6. An abnormality determination apparatus of an internal combustion engine in which an intake passage located upstream of a forced-induction system and a crankcase are connected by a breather line, comprising:
an intake flow rate detection detector that detects an intake flow rate in the intake passage; and
an abnormality determination unit that determines abnormality of the breather line, wherein
the abnormality determination unit:
determine a length of time T during which a rotation second-order component of a fluctuation waveform of the intake flow rate is equal to or more than a threshold for each peak in fluctuation of the rotation second-order component over a predetermined period of time,
accumulates the length of time T to obtain an accumulated value of length of time, and
determines occurrence of the abnormality of the breather line when the accumulated value is less than a predetermined accumulation threshold,
wherein the rotation second-order component is calculated by multiplying the fluctuation waveform of the intake flow rate by a sine wave and a cosine wave corresponding to an angular velocity of a crank of the engine, followed by integration.

* * * * *